(12) United States Patent
VanderSluis et al.

(10) Patent No.: US 11,702,153 B2
(45) Date of Patent: Jul. 18, 2023

(54) ACTIVE DEPLOYABLE BI-LEVEL SPOILER ARCHITECTURE ENABLING FULL VEHICLE DRAG REDUCTION

(71) Applicants: Daniel VanderSluis, Rochester Hills, MI (US); Magna Exteriors Inc., Concord (CA)

(72) Inventors: Daniel VanderSluis, Rochester Hills, MI (US); Martin Matthews, Troy, MI (US)

(73) Assignee: MAGNA EXTERIORS, INC., Concord (CA)

( * ) Notice: Subject to any disclaimer, the term of this patent is extended or adjusted under 35 U.S.C. 154(b) by 269 days.

(21) Appl. No.: 17/263,022

(22) PCT Filed: Jul. 26, 2019

(86) PCT No.: PCT/US2019/043651
§ 371 (c)(1),
(2) Date: Jan. 25, 2021

(87) PCT Pub. No.: WO2020/023868
PCT Pub. Date: Jan. 30, 2020

(65) Prior Publication Data
US 2021/0229759 A1 Jul. 29, 2021

Related U.S. Application Data

(60) Provisional application No. 62/703,735, filed on Jul. 26, 2018.

(51) Int. Cl.
*B62D 37/02* (2006.01)
*B62D 35/00* (2006.01)

(52) U.S. Cl.
CPC ........... *B62D 37/02* (2013.01); *B62D 35/007* (2013.01); *B62D 35/008* (2013.01)

(58) Field of Classification Search
CPC .... B62D 37/02; B62D 35/007; B62D 35/008; Y02T 10/82
See application file for complete search history.

(56) References Cited

U.S. PATENT DOCUMENTS

| | | | |
|---|---|---|---|
| 2016/0159412 A1* | 6/2016 | Oxley | B62D 35/007 296/180.5 |
| 2019/0382063 A1* | 12/2019 | McAfee | B60J 10/72 |
| 2022/0242496 A1* | 8/2022 | McAfee | B62D 35/008 |

* cited by examiner

*Primary Examiner* — Lori L Lyjak
(74) *Attorney, Agent, or Firm* — Warn Partners, P.C.

(57) ABSTRACT

An active rear airfoil arrangement (10) for a trailing area of a vehicle having a turbulence creating area. The arrangement (10) is for connection with a static rear horizontal spoiler (20) associated with the rear portion of a vehicle and includes an active rear horizontal spoiler (30a, 30b, 30c). The active rear horizontal spoiler (30a, 30b, 30c) moves to a deployed position and forms a flow passage (48a, 48b, 48c, 48d) that extends horizontally across the top of a liftgate (12). In another aspect of the invention the active rear airfoil arrangement (10) includes vertical left and right active spoilers (32a,32b; 36a,36b) that move to create a flow passage (74,76,88,90) on the left side and right side of a liftgate (12).

19 Claims, 4 Drawing Sheets

ACTIVE DEPLOYABLE BI-LEVEL SPOILER ARCHITECTURE ENABLING FULL VEHICLE DRAG REDUCTION

FIELD OF THE INVENTION

The present invention relates to an active rear airfoil arrangement for a vehicle utilizing kinematic actuation.

BACKGROUND OF THE INVENTION

"Spoilers" are known for use in vehicles for providing aerodynamic and styling benefits to various vehicles. In SUV type vehicles the spoiler is typically provided at the upper lift gate area wherein it is either attached to the roof or to the top of the lift gate of this type of vehicle.

The use of spoilers on SUV type vehicles reduces turbulent wake at the back area of SUV's thereby reducing coefficient of drag (Cd) and improves fuel economy. Static rear spoilers have been implemented to reduce drag but do not provide any adjustability due to their static nature. The present invention seeks to provide an active rear horizontal spoiler used in combination with a static rear spoiler to create a dimensionally adjustable horizontal flow passage with added benefits. The present invention also seeks to provide additional vertical flow passages created by active vertical spoilers, in combination with an active horizontal spoiler provides further added aerodynamic benefits.

SUMMARY OF THE INVENTION

The present invention is directed to an active rear airfoil arrangement for a trailing area of a vehicle having a turbulence creating area comprising. The arrangement is for connection with a static rear horizontal spoiler associated with the rear portion of a vehicle. In another aspect of the invention the active rear airfoil arrangement is connected to a static spoiler that is part of a vehicle rear liftgate. The static rear horizontal spoiler extends beyond a rear liftgate of the vehicle and has a top surface and a bottom surface.

The arrangement includes an active rear horizontal spoiler that also includes a top surface and a bottom surface. The active rear horizontal spoiler is capable of moving between a stowed position and a deployed position. When in the stowed position, the bottom surface of the active rear horizontal spoiler rests against the top surface of the static rear horizontal spoiler to eliminate any airflow between the active rear horizontal spoiler and the static rear horizontal spoiler. When moved to the deployed position the active rear horizontal spoiler moves substantially upward from the static rear horizontal spoiler to create a horizontal flow passage.

There are stanchions extending between the active rear horizontal spoiler and the top surface of the static rear horizontal panel. The stanchions are connected to an actuator that is capable of moving with the active rear horizontal spoiler between a stowed position, deployed position and an intermediate position between the stowed position and the deployed position. When in the active rear horizontal spoiler is in the deployed or intermediate position a one or more flow passages are formed. Each flow passage has an inlet, an outlet and a pathway defined by the bottom surface of the active rear horizontal spoiler and a top surface of the static spoiler and two stanchions. The pathway is tapered such that the inlet is larger than the outlet and is also adjustable in size depending on the position of the active rear horizontal spoiler.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
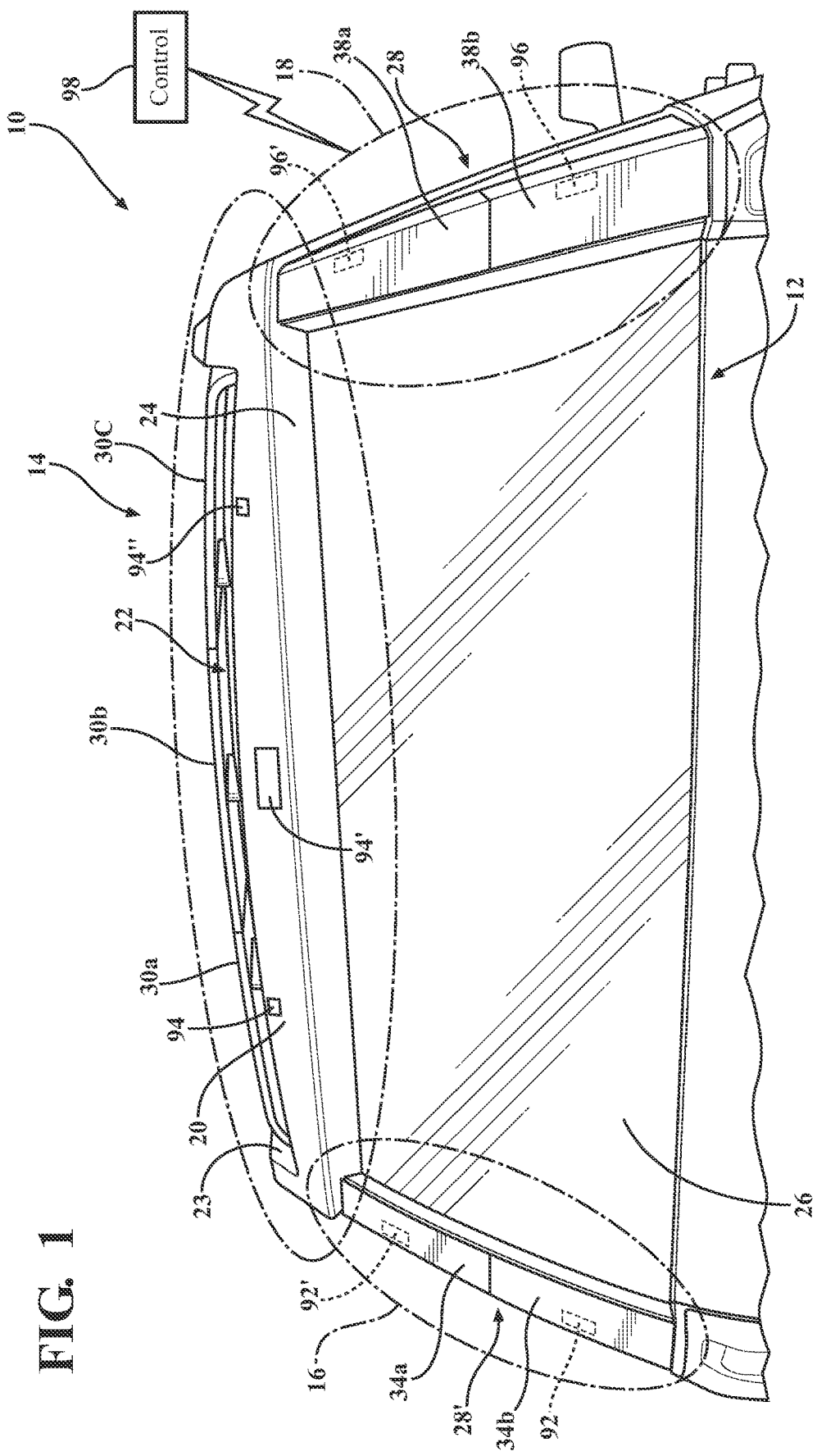
FIG. 1 is a rear perspective view of an active rear airfoil arrangement in the stowed position.
Figure 2:
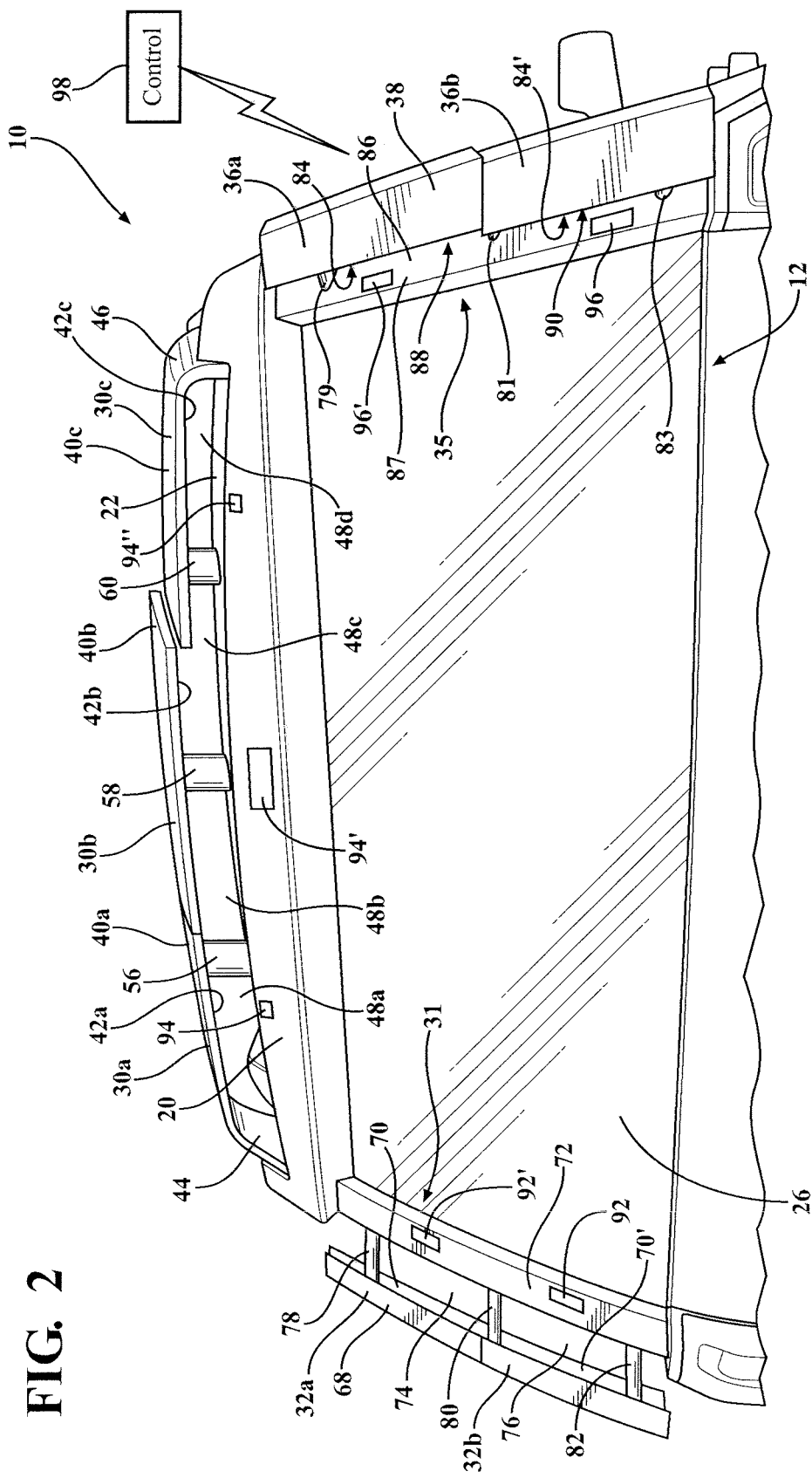
FIG. 2 is a rear perspective view of an active rear airfoil arrangement in the deployed position.

Referring now to FIGS. 1 and 2 there is a perspective view of an active rear airfoil arrangement 10 shown in a stowed position (FIG. 1) and a deployed position (FIG. 2). As show in FIG. 1 there is a liftgate 12 for a vehicle that has a horizontal zone 14 located across the top of the liftgate 12. Within the horizontal region 14 there is a static spoiler that extends beyond an exterior surface 26 of the liftgate 12. The static spoiler 20 has a top surface 22 and a bottom surface 24 of the liftgate 12. Within the horizontal region 14 there are a plurality of active rear horizontal spoilers 30a, 30b, 30c shown in the stowed position located above the static spoiler 20. While three active rear horizontal spoilers 30a, 30b, 30c are shown it is within the scope of this invention for there to be a greater or lesser number of active rear horizontal spoilers to be used, depending on the needs of a particular application.

The active rear airfoil arrangement 10 further includes a left vertical zone 16 and a right vertical zone 18 that include the respective rear pillars 28, 28' of the liftgate 12. The left vertical zone 16 includes two a left side active spoilers 32a, 32b shown in the stowed position so that only an outer surface 34a, 34b is shown. The right vertical zone 18 include right side active spoilers 36a, 36b having an outer surface 38a, 38b shown in the stowed position so that only an outer surface 38a, 38b is shown. While two left side active spoilers 32a, 32b and two right side active spoilers 38a, 38b are shown it is within the scope of this invention for a greater number or lesser number of spoilers to be used depending on the needs of a particular application.

Referring now to FIG. 2 the active rear airfoil arrangement 10 is shown in the deployed position. The active rear horizontal spoilers 30a, 30b, 30c each have a top surface 40a, 40b, 40c and a bottom surface 42a, 42b, 42c. When the active rear horizontal spoilers 30a, 30b, 30c are in the stowed position, as shown in FIG. 1, each bottom surface 42a, 42b, 42c of the active rear horizontal spoilers 30a, 30b, 30c rest against the top surface 22 of the static rear horizontal spoiler 20, which is recessed to from a pocket 23. When in a stowed position the active rear horizontal spoilers 30a, 30b, 30c nest in the pocket 23 so that the top surface 40a, 40b, 40c is flush with the roof of the vehicle and any surrounding structures, such as a portion of the static rear horizontal spoiler 20.

Figure 3:
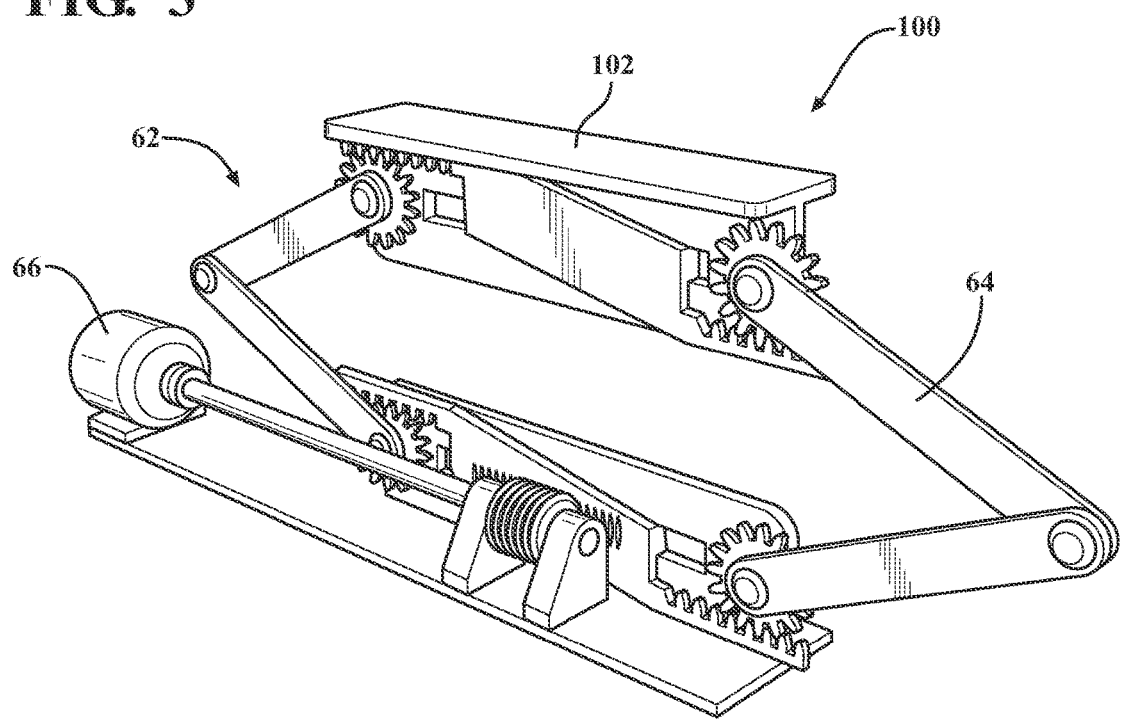
FIG. 3 is a side view of a kinematic stanchion according to the present invention.

Extending between the bottom surface 42a, 42b, 42c of each of the plurality of active rear horizontal spoilers 30a, 30b, 30c and the top surface 22 of the static spoiler are stanchions 44, 46, 56, 58, 60. The stanchions 44, 46, 56, 58, 60 connected to the bottom surface 42a, 42b, 42c and extend through the top surface 22 of the static spoiler 20 into a cavity in the static spoiler 20. Within the cavity is an actuator or multiple actuators that connect to each of the stanchions 44, 46, 56, 58, 60. FIG. 3 shows one exemplary embodiment of an actuator 100 that connects to one or more ends of the stanchions 44, 46, 56, 58, 60 at a moveable base 102. The details of the actuator 100 are further discussed below, however it is within the scope of the invention for other style actuators to be used, such as but not limited to a rotary actuator, hydraulic actuator, or linear actuator. The actuator 100 is used to raise and lower each respective one of the plurality of active rear horizontal spoilers 30a, 30b, 30c between a stowed position, deployed position and a plurality of intermediate positions.

Figure 4:
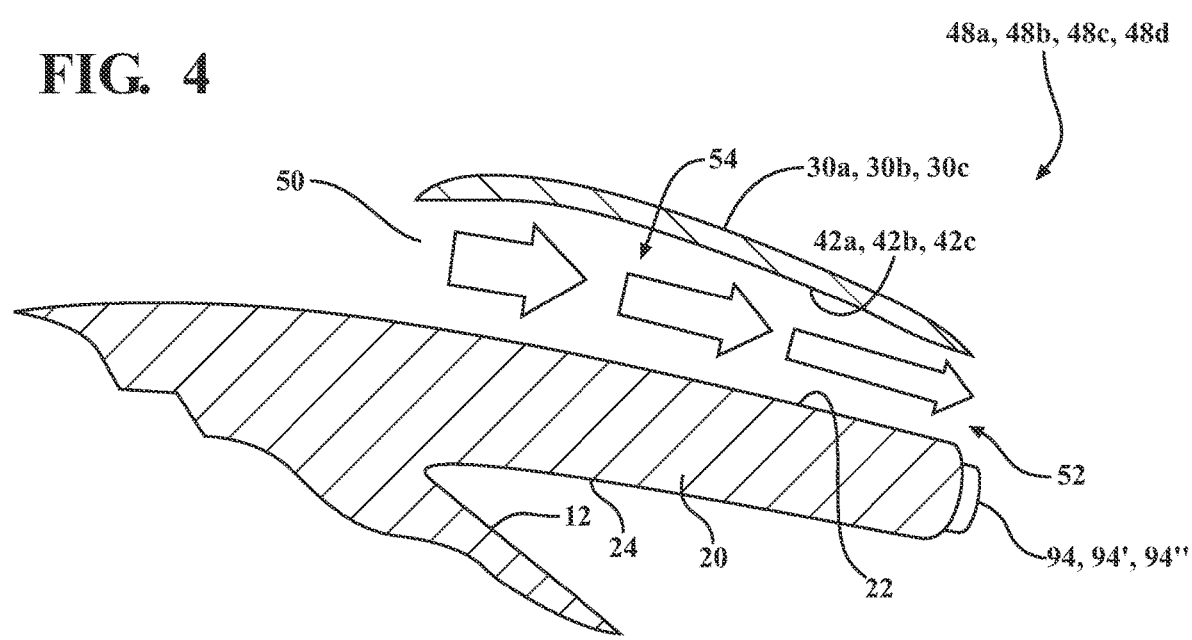
FIG. 4 is a cross-sectional schematic view of an horizontal flow passage created when active rear horizontal spoiler is in the deployed or intermediate position.

When the active rear horizontal spoilers 30a, 30b, 30c are in the deployed position or intermediate position a plurality of flow passages 48a, 48b, 48c, 48d extend horizontally along the length of the static spoiler 20. Referring now to FIG. 4 the flow passages 48a, 48b, 48c, 48d each have an inlet 50, an outlet 52 and a pathway 54 defined by the bottom surface 42a, 42b, 42c of the active rear horizontal spoiler 30a, 30b, 30c and a top surface 22 of the static spoiler 20 and stanchions 44, 46, 56, 58, 60. The pathway 54 is tapered such that the inlet 50 is larger than the outlet 52.

Also referring to FIGS. 1-3, there are telltale sensors 94, 94', 94" located at the outlet 52 of each of the plurality of flow passages 48a, 48b, 48c, 48d. The telltale sensors 94, 94', 94" detect air speed flowing out of the outlet 52 of the pathway 54 and send data signals to a control 98, which can be a localized controller or part of the vehicle ICU. The control 98 has an algorithm programmed that calculates the ideal air speed needed based on factors such as vehicle speed, size, and location of the flow passages 48a, 48b, 48c, 48d. The control 98 then commands the actuator 100 to adjust the size of the flow passages 48a, 48b, 48c, 48d by moving the active rear horizontal spoilers 30a, 30b, 30c to different positions. The size of the flow passages 48a, 48b, 48c, 48d can be asymmetrical as well as symmetrical, which can affect the air flow rearward of the vehicle. For example, FIG. 2 shows flow passage 48d having a different area than flow passages 48a, 48b, 48c. Flow passages 48a, 48b are similar in size, while flow passage 48c has a different size and shape.

FIG. 2 also shows the left side active spoilers 32a, 32b moveably positioned on a left side 31 of the liftgate 12. While the left side active spoilers 32a, 32b are shown as two pieces it is within the scope of this invention for a greater or lesser number of pieces to be used depending on a particular application. The left side active spoilers 32a, 32b each have an outer surface 68 forming an exterior surface of the liftgate 12 and a bottom surface 70, 70' that nests against the left side 31 when in the stowed position as shown in FIG. 1. The left side active spoilers 32a, 32b are capable of moving between a stowed position (shown in FIG. 1), a deployed positon (shown in FIG. 2) and a plurality of intermediate positions between the stowed position and the deployed position. When the left side active spoilers 32a, 32b are in the stowed position, the bottom surface 70, 70' of the left side active spoilers 32a, 32b rest against an exterior surface 72 of the left side 21 of the liftgate 12. Extending between the left side active spoilers 32a, 32b and the left side 31 are stanchions 78, 80, 82. The stanchions 78, 80, 82 connect to the bottom surface 70, 70' of respective one of the left side active spoilers 32a, 32b and extend into a cavity within the left side 31 of the liftgate 12, where they connect to one or more actuators, that move the stanchions 78, 80, 82 and left side active spoilers 32a, 32b between the stowed position, deployed position and one more intermediate positions.

The movement of the left side active spoilers 32a, 32b between the stowed and deployed position is provided by an actuator (not shown) contained in a cavity of the left side 31 of the liftgate 12. FIG. 3 shows one exemplary embodiment of the actuator 100 that connects to one or more ends of the stanchions 78, 80, 82 at the moveable base 102. The details of the actuator 100 are further discussed below, however it is within the scope of the invention for other style actuators to be used, such as but not limited to a rotary actuator, hydraulic actuator, or linear actuator. The actuator 100 is used to extend and retract each respective one of the left side active spoilers 32a, 32b between a stowed position, deployed position and a plurality of intermediate positions.

FIG. 2 also shows the right side active spoilers 36a, 36b moveably positioned on a right side 35 of the liftgate 12. While the right side active spoilers 36a, 36b are shown as two pieces it is within the scope of this invention for a greater or lesser number of pieces to be used depending on a particular application. The right side active spoilers 36a, 36b each have an outer surface 68 forming an exterior surface of the liftgate 12 and a bottom surface 70 that nests against the right side 35 when in the stowed position as shown in FIG. 1. The right side active spoilers 36a, 36b are capable of moving between a stowed position (shown in FIG. 1), a deployed positon (shown in FIG. 2) and a plurality of intermediate positions between the stowed position and the deployed position. When the right side active spoilers 36a, 36b are in the stowed position, the bottom surface 84, 84' of the right side active spoilers 36a, 36b rest against an exterior surface 87 of the right side 35 of the liftgate 12. Extending between the right side active spoilers 36a, 36b and the right side 35 are stanchions 79, 81, 83. The stanchions 79, 81, 83 connect to the bottom surface 84, 84' of respective ones of the right side active spoilers 36a, 36b and extend into a cavity within the right side 35 of the liftgate 12 where they connect to one or more actuators, that move the stanchions 79, 81, 83 and right side active spoilers 36a, 36b between the stowed position, deployed position and one more intermediate positions.

The movement of the right side active spoilers 36a, 36b between the stowed and deployed position is provided by an actuator (not shown) contained in a cavity of the right side 35 of the liftgate 12. FIG. 3 shows one exemplary embodiment of the actuator 100 that connects to one or more ends of the stanchions 79, 81, 83 at the moveable base 102. The details of the actuator 100 are further discussed below, however it is within the scope of the invention for other style actuators to be used, such as but not limited to a rotary actuator, hydraulic actuator, or linear actuator. The actuator 100 is used to extend and retract each respective one of the right side active spoilers 36a, 36b between a stowed position, deployed position and a plurality of intermediate positions.

Figure 5:
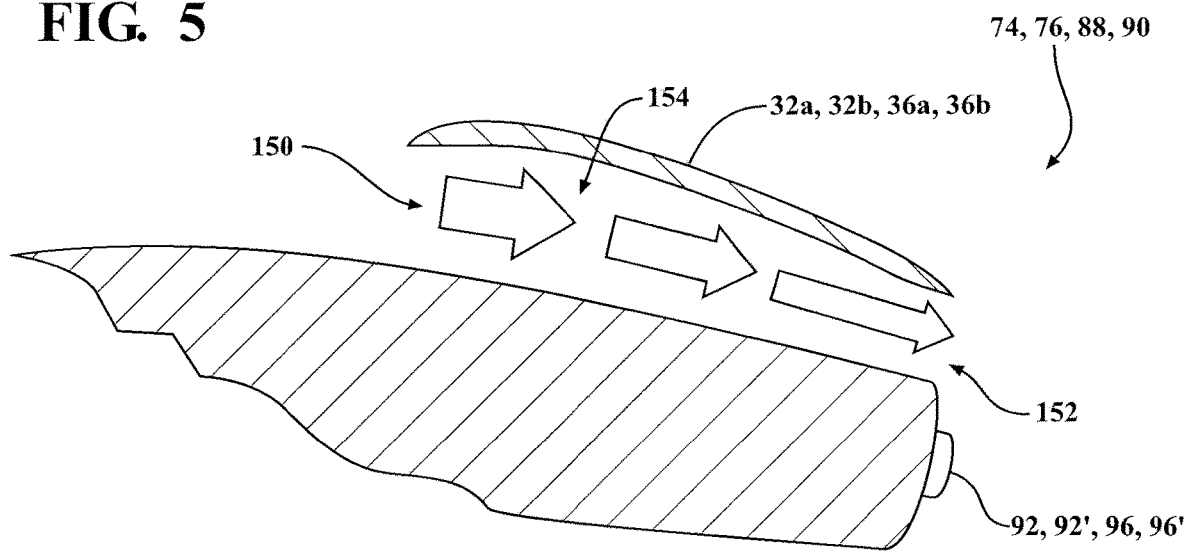
FIG. 5 is a schematic cross sectional overhead view a flow passage formed when a respective one of the left side active spoilers or right side active spoilers is in the intermediate or deployed position.

Referring now to FIG. 5 there is a schematic cross sectional overhead view one of flow passages 74, 76, 88, 90 formed when a respective one of the left side active spoilers 32a, 32b or right side active spoilers 36a, 36b are moved to the deployed or intermediate positions. Each flow passage 74, 76, 88, 90 has an inlet 150, an outlet 152 and a pathway 154 defined by the bottom surface 70, 70', 84, 84' of the respective one of the left side active spoilers 32a, 32b or right side active spoilers 36a, 36b, the exterior surface 72, 82 of the left side 31 or right side 35 and stanchions 78, 79, 80, 81, 82, 83 (shown in FIG. 2). The pathway 154 is tapered such that the inlet 150 is larger than the outlet 152.

Also referring to FIGS. 1, 2 and 5, there are telltale sensors 92, 92', 96, 96' located at the outlet 152 of each of the plurality of flow passages 74, 76, 88, 90. The telltale sensors 92, 92', 96, 96' detect air speed flowing out of the outlet 152 of the pathway 154 and send data signals to a control 98. The control 98 has an algorithm programmed that calculates the ideal air speed needed based on the factors such as vehicle speed, size, and location of the flow passages 74, 76, 88, 90. The control 98 then commands the actuator 100 to adjust the size of the flow passages 74, 76, 88, 90 by moving the left side active spoilers 32a, 32b or right side active spoilers 36a, 36b to different positions. The size of the flow passages 74, 76, 88, 90 can be asymmetrical. For example, FIG. 2 shows flow passage 88 having a different area than flow passages 74, 76, 90.

Referring to FIG. 3 the details of one actuator 100, which is a kinematic stanchion, is shown according to one embodiment of the invention. As shown each one of the kinematic stanchions includes a linkage 64 driven by a motor 66. The linkage 64 as shown is a four bar linkage that provides the kinematic movement of one of the stanchions 44, 46, 56, 58, 60, 78, 79, 80, 81, 82, 83 that it is connected to, which can be positioned at various positions along the path of movement of the linkage 64.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active rear airfoil arrangement for a trailing area of a vehicle having a turbulence creating area comprising:
   a static rear horizontal spoiler on a rear liftgate of the vehicle and having a top surface;
   at least one active rear horizontal spoiler having a top surface and a bottom surface, wherein the at least one active rear horizontal spoiler is capable of moving between a stowed position and a deployed position relative to the static rear horizontal spoiler;
   at least one flow passage formed between the static rear horizontal spoiler and the at least one active rear horizontal spoiler when the at least one active rear horizontal spoiler moves to the deployed position thereby reducing the vehicle drag coefficient by controlling the wake of the vehicle using accelerated jetted air, wherein the at least one flow passage formed between the static rear horizontal spoiler and the at least one active rear horizontal spoiler is adjustable by moving between a stowed position, a plurality of intermediate positions and a deployed position relative to the static rear horizontal spoiler;
   at least one left side active spoiler and at least one right side active spoiler moveably positioned on the respective left side of a liftgate and right side of the liftgate, wherein the at least one left side active spoiler and at least one right side active spoiler are capable of moving between a stowed position and a deployed position; and
   at least one flow passage formed between the at least one left side active spoiler and the left side of the liftgate, thereby reducing the vehicle drag coefficient by controlling the wake of the vehicle using accelerated jetted air wherein the at least one flow passage formed between the at least one left side active spoiler and the left side of the liftgate is adjustable to one of the stowed position, the deployed position and a plurality of intermediate positions between the stowed position and the deployed position;
   at least one flow passage formed between the at least one right side active spoiler and the right side of the liftgate, thereby reducing the vehicle drag coefficient by controlling the wake of the vehicle using accelerated jetted air wherein the at least one flow passage formed between the at least one right side active spoiler and the right side of the liftgate is adjustable to one of the stowed position, the deployed position and a plurality of intermediate positions between the stowed position and the deployed position.

2. The active rear airfoil arrangement of claim 1 wherein the at least one flow passage formed between the static rear horizontal spoiler and the at least one active rear horizontal spoiler has an inlet, an outlet and a pathway defined by a bottom surface of the active rear horizontal spoiler and a top surface of the static spoiler and two moveable side supports, wherein the pathway is tapered such that the inlet is larger than the outlet.

3. The active rear airfoil arrangement of claim 2 further comprising:
   wherein the at least one flow passage between the at least one left side active spoiler and the left side of the liftgate has an inlet, an outlet and a pathway defined by an outer surface of the at least one left side active spoiler and the bottom surface of the at least one left side active spoiler and two moveable side supports, wherein the pathway is tapered such that the inlet is larger than the outlet; and
   wherein the at least one flow passage between the at least one right side active spoiler and the right side of the liftgate has an inlet, an outlet and a pathway defined by an outer surface of the at least one right side active spoiler and the bottom surface of the at least one right side active spoiler and two moveable side supports, wherein the pathway is tapered such that the inlet is larger than the outlet.

4. The active rear airfoil arrangement of claim 1 further comprising:
   at least one telltale sensor located on the static rear horizontal spoiler for detecting air speed flowing through the at least one flow passage formed between the static rear horizontal spoiler and the at least one active horizontal spoiler, wherein the at least one telltale sensor located on the static rear horizontal spoiler provides air speed data that is used by a control unit to calculate and move the at least one active rear horizontal spoiler thereby actively adjusting the size of the at least one air flow passage formed between the static rear horizontal spoiler and the at least one active rear horizontal spoiler.

5. The active rear airfoil arrangement of claim 4 further comprising:
- at least one telltale sensor located on the left side of the liftgate for detecting air speed flowing through the at least one flow passage formed between the left side of the liftgate and the at least one left side active spoiler, wherein the at least one telltale sensor located on the left side of the liftgate provides air speed data that is used by a control unit to calculate and move the at least one left side active spoiler thereby actively adjusting the size of the at least one air flow passage formed between the left side of the liftgate and the at least one left side active spoiler; and
- at least one telltale sensor located on the right side of the liftgate for detecting air speed flowing through the at least one flow passage formed between the right side of the liftgate and the at least one right side active spoiler, wherein the at least one telltale sensor located on the right side of the liftgate provides air speed data that is used by a control unit to calculate and move the at least one right side active spoiler thereby actively adjusting the size of the at least one air flow passage formed between the right side of the liftgate and the at least one right side active spoiler.

6. The active rear airfoil arrangement of claim 1 further comprising:
- at least one telltale sensor located on the left side of the liftgate for detecting air speed flowing through the at least one flow passage formed between the left side of the liftgate and the at least one left side active spoiler, wherein the at least one telltale sensor located on the left side of the liftgate provides air speed data that is used by a control unit to calculate and move the at least one left side active spoiler thereby actively adjusting the size of the at least one air flow passage formed between the left side of the liftgate and the at least one left side active spoiler; and
- at least one telltale sensor located on the right side of the liftgate for detecting air speed flowing through the at least one flow passage formed between the right side of the liftgate and the at least one right side active spoiler, wherein the at least one telltale sensor located on the right side of the liftgate provides air speed data that is used by a control unit to calculate and move the at least one right side active spoiler thereby actively adjusting the size of the at least one air flow passage formed between the right side of the liftgate and the at least one right side active spoiler.

7. The active rear airfoil arrangement of claim 1 further comprising, a pocket formed in the static rear horizontal spoiler that the at least one active rear horizontal spoiler nests in when moved to the stowed position.

8. The active rear airfoil arrangement of claim 1 further comprising, at least one actuator contained in the static rear horizontal spoiler and connected to the at least one active rear horizontal spoiler for moving the at least one active rear horizontal spoiler between the stowed position, the deployed position and one of the plurality of intermediate positions.

9. The active rear airfoil arrangement of claim 8 further comprising:
- at least one actuator contained in the left side of the liftgate, the at least one actuator is connected to the at least one left side active spoiler for moving at least one left side active spoiler between the stowed position, the deployed position and one of the plurality of intermediate positions; and
- at least one actuator contained in the right side of the liftgate, the at least one actuator is connected to the at least one right side active spoiler for moving at least one right side active spoiler between the stowed position, the deployed position and one of the plurality of intermediate positions.

10. The active rear airfoil arrangement of claim 1 further comprising:
- at least one actuator contained in the left side of the liftgate, the at least one actuator is connected to the at least one left side active spoiler for moving at least one left side active spoiler between the stowed position, the deployed position and one of the plurality of intermediate positions; and
- at least one actuator contained in the right side of the liftgate, the at least one actuator is connected to the at least one right side active spoiler for moving at least one right side active spoiler between the stowed position, the deployed position and one of the plurality of intermediate positions.

11. An active rear airfoil arrangement for a trailing area of a vehicle having a turbulence creating area comprising:
- a static rear horizontal spoiler on a rear liftgate of the vehicle and having a top surface;
- a plurality of active rear horizontal spoilers having a top surface and a bottom surface, wherein each one of the plurality of active rear horizontal spoilers is capable of moving between a stowed position and a deployed position relative to the static rear horizontal spoiler; and
- at least one flow passage formed between the static rear horizontal spoiler and each one of the plurality of active rear horizontal spoilers when the each one of the plurality of active rear horizontal spoilers moves to the deployed position thereby reducing the vehicle drag coefficient by controlling the wake of the vehicle using accelerated jetted air, wherein the at least one flow passage formed between the static rear horizontal spoiler and the one of the plurality of active rear horizontal spoilers is adjustable by moving between a stowed position, a plurality of intermediate positions and a deployed position relative to the static rear horizontal spoiler.

12. The active rear airfoil arrangement of claim 11 further comprising:
- at least one telltale sensor located on the static rear horizontal spoiler for detecting air speed flowing through the at least one flow passage formed between the static rear horizontal spoiler and the one of the plurality of active rear horizontal spoilers, wherein the at least one telltale sensor located on the static rear horizontal spoilers provides air speed data that is used by a control unit to calculate and move the one of the plurality of active rear horizontal spoilers, wherein the at least one telltale sensor located on the static rear horizontal spoilers, thereby actively adjusting the size of the at least one air flow passage formed between the static rear horizontal spoiler and the one of the plurality of active rear horizontal spoilers.

13. The active rear airfoil arrangement of claim 11 further comprising:
- at least one left side active spoiler and at least one right side active spoiler moveably positioned on the respective left side of a liftgate and right side of the liftgate, wherein the at least one left side active spoiler and at least one right side active spoiler are capable of moving between a stowed position and a deployed position; and at least one flow passage formed between the at least one left side active spoiler and the left side of the liftgate, thereby reducing the vehicle drag coefficient by controlling the wake of the vehicle using accelerated jetted air wherein the at least one flow passage formed between the at least one left side active spoiler and the left side of the liftgate is adjustable to one of the stowed position, the deployed position and a plurality of intermediate positions between the stowed position and the deployed position;

at least one flow passage formed between the at least one right side active spoiler and the right side of the liftgate, thereby reducing the vehicle drag coefficient by controlling the wake of the vehicle using accelerated jetted air wherein the at least one flow passage formed between the at least one right side active spoiler and the right side of the liftgate is adjustable to one of the stowed position, the deployed position and a plurality of intermediate positions between the stowed position and the deployed position.

14. The active rear airfoil arrangement of claim 13 further comprising:

at least one actuator contained in the left side of the liftgate, the at least one actuator is connected to the at least one left side active spoiler for moving at least one left side active spoiler between the stowed position, the deployed position and one of the plurality of intermediate positions; and at least one actuator contained in the right side of the liftgate, the at least one actuator is connected to the at least one right side active spoiler for moving at least one right side active spoiler between the stowed position, the deployed position and one of the plurality of intermediate positions.

15. The active rear airfoil arrangement of claim 13 further comprising:

at least one telltale sensor located on the left side of the liftgate for detecting air speed flowing through the at least one flow passage formed between the left side of the liftgate and the at least one left side active spoiler, wherein the at least one telltale sensor located on the left side of the liftgate provides air speed data that is used by a control unit to calculate and move the at least one left side active spoiler thereby actively adjusting the size of the at least one air flow passage formed between the left side of the liftgate and the at least one left side active spoiler; and at least one telltale sensor located on the right side of the liftgate for detecting air speed flowing through the at least one flow passage formed between the right side of the liftgate and the at least one right side active spoiler, wherein the at least one telltale sensor located on the right side of the liftgate provides air speed data that is used by a control unit to calculate and move the at least one right side active spoiler thereby actively adjusting the size of the at least one air flow passage formed between the right side of the liftgate and the at least one right side active spoiler.

16. The active rear airfoil arrangement of claim 11 further comprising, a pocket formed in the static rear horizontal spoiler that the plurality of active rear horizontal spoilers nest in when moved to the stowed position.

17. The active rear airfoil arrangement of claim 11 further comprising, at least one actuator contained in the static rear horizontal spoiler and connected to a respective one of the plurality of active rear horizontal spoilers for moving the respective one of the plurality of active rear horizontal spoilers between the stowed position, the deployed position and one of the plurality of intermediate positions.

18. The active rear airfoil arrangement of claim 11 wherein the at least one flow passage has an inlet, an outlet and a pathway defined by a bottom surface of the active rear horizontal spoiler and a top surface of the static spoiler and two moveable side supports, wherein the pathway is tapered such that the inlet is larger than the outlet.

19. The active rear airfoil arrangement of claim 18 further comprising:

wherein the at least one flow passage between the at least one left side active spoiler and the left side of the liftgate has an inlet, an outlet and a pathway defined by an outer surface of the at least one left side active spoiler and the bottom surface of the at least one left side active spoiler and two moveable side supports, wherein the pathway is tapered such that the inlet is larger than the outlet; and wherein the at least one flow passage between the at least one right side active spoiler and the right side of the liftgate has an inlet, an outlet and a pathway defined by an outer surface of the at least one right side active spoiler and the bottom surface of the at least one right side active spoiler and two moveable side supports, wherein the pathway is tapered such that the inlet is larger than the outlet.

* * * * *